United States Patent
Yang et al.

(10) Patent No.: US 12,470,337 B2
(45) Date of Patent: Nov. 11, 2025

(54) METHOD AND APPARATUS FOR COORDINATED COMMUNICATION BETWEEN MULTIPLE ACCESS POINTS, AND STORAGE MEDIUM

(71) Applicant: HUAWEI TECHNOLOGIES CO., LTD., Guangdong (CN)

(72) Inventors: Bowen Yang, Nanjing (CN); Chenhe Ji, Nanjing (CN); Yungui Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 369 days.

(21) Appl. No.: 18/171,674

(22) Filed: Feb. 21, 2023

(65) Prior Publication Data
US 2023/0208577 A1 Jun. 29, 2023

Related U.S. Application Data

(63) Continuation of application No. PCT/CN2021/114783, filed on Aug. 26, 2021.

(30) Foreign Application Priority Data

Aug. 31, 2020 (CN) .......................... 202010893950.7

(51) Int. Cl.
*H04L 5/00* (2006.01)
*H04W 16/10* (2009.01)
(52) U.S. Cl.
CPC .......... *H04L 5/0035* (2013.01); *H04L 5/0055* (2013.01); *H04W 16/10* (2013.01)

(58) Field of Classification Search
CPC ...... H04L 5/0035; H04L 5/0055; H04L 16/10
See application file for complete search history.

(56) References Cited

U.S. PATENT DOCUMENTS

| | | | |
|---|---|---|---|
| 2015/0163043 A1* | 6/2015 | Lee | ........................ H04L 5/0073 370/336 |
| 2020/0076552 A1* | 3/2020 | Cherian | ................ H04L 5/0035 |

FOREIGN PATENT DOCUMENTS

| | | |
|---|---|---|
| CN | 104168662 A | 11/2014 |
| CN | 105493583 A | 4/2016 |
| CN | 107040356 A | 8/2017 |
| CN | 109067436 A | 12/2018 |

(Continued)

OTHER PUBLICATIONS

Lochan Verma (Qualcomm), et. al., Coordinated AP Time/Frequency Sharing in a Transmit Opportunity in 11be, IEEE 802.11-19/1582r2, Nov. 2019, 15 pages.

*Primary Examiner* — Brian P Cox

(57) ABSTRACT

A method and apparatus for coordinated communication between multiple access points, and a storage medium are disclosed. The method includes: A first access point (AP) sends a coordinated frame to an AP in a coordinated group. The coordinated frame indicates at least one AP in the coordinated group and the first AP to perform a coordinated operation within an effective time period. The coordinated group includes a plurality of APs operating on the same channel. The first AP is an AP that obtains an access opportunity for the channel in the coordinated group. A time length of the effective time period exceeds a time length of a transmit opportunity (TXOP). According to this application, channel utilization can be improved.

9 Claims, 5 Drawing Sheets

(56) References Cited

FOREIGN PATENT DOCUMENTS

| | | | |
|---|---|---|---|
| CN | 109673028 A | 4/2019 | |
| CN | 110536469 A | 12/2019 | |
| CN | 111050328 A | 4/2020 | |
| CN | 111247850 A | 6/2020 | |
| EP | 3641458 B1 * | 5/2024 | ........... H04L 5/0035 |
| WO | 2020068385 A1 | 4/2020 | |

* cited by examiner

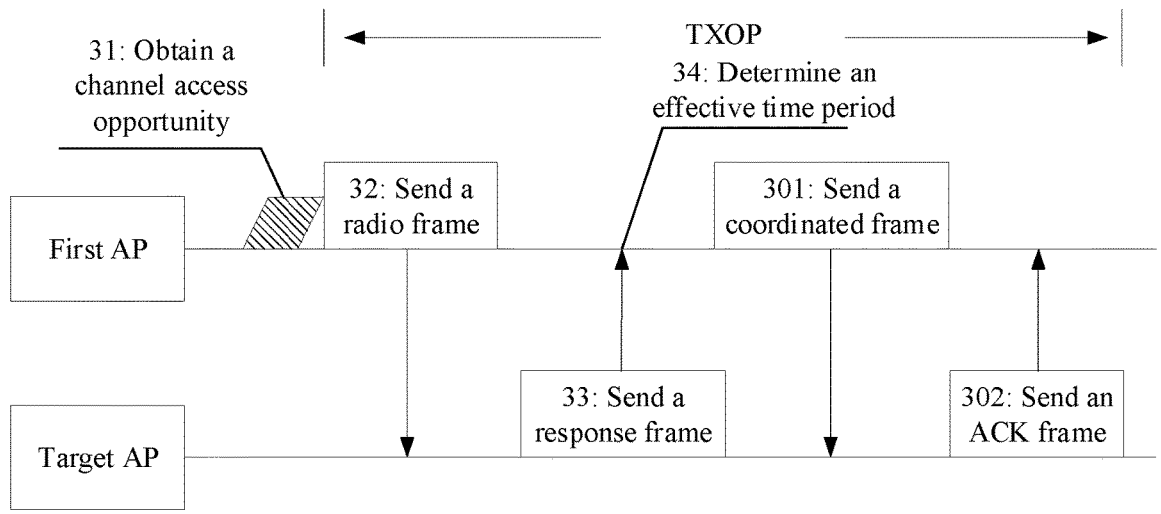
FIG. 5
| Frame Control | Duration | RA | TA | Common Info | User Info List | Padding | FCS |
FIG. 6
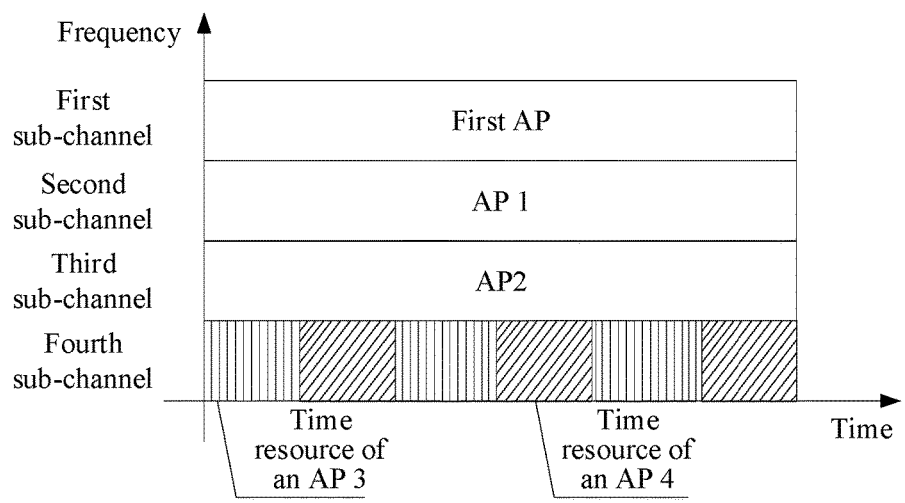
FIG. 7

METHOD AND APPARATUS FOR COORDINATED COMMUNICATION BETWEEN MULTIPLE ACCESS POINTS, AND STORAGE MEDIUM

CROSS-REFERENCE TO RELATED APPLICATIONS

This application is a continuation of International Application No. PCT/CN2021/114783, filed on Aug. 26, 2021, which claims priority to Chinese Patent Application No. 202010893950.7, filed on Aug. 31, 2020. The disclosures of the aforementioned applications are hereby incorporated by reference in their entireties.

TECHNICAL FIELD

This application relates to the communication field, and in particular, to a method and apparatus for coordinated communication between multiple access points, and a storage medium.

BACKGROUND

A wireless local area network (wireless local area network, WLAN) includes an access point (access point, AP) and a station (station, STA). The AP is configured to provide wireless coverage for access by the STA.

With development of technologies, a channel bandwidth on which the AP can operate is increasingly large. For example, the AP in a 5G network may operate on a large-bandwidth channel such as 80 megahertz (MHz) or 160 MHz. Currently, one WLAN may include a plurality of APs. However, a quantity of large-bandwidth channels is limited. Therefore, operating channels of two APs whose coverage areas overlap may be the same or overlap. Consequently, a probability that a conflict occurs between the two APs is high, and therefore channel utilization is reduced. For example, when the two APs simultaneously transmit data on respective operating channels, a conflict occurs, thereby affecting channel utilization.

SUMMARY

This application provides a method and apparatus for coordinated communication between multiple access points, and a storage medium, to improve channel utilization. Technical solutions are as follows.

According to a first aspect, this application provides a method for coordinated communication between multiple access points. In the method, a first access point AP sends a coordinated frame to an AP in a coordinated group. The coordinated frame is used to indicate at least one AP in the coordinated group and the first AP to perform a coordinated operation within an effective time period. The coordinated group includes a plurality of APs operating on the same channel. The first AP is an AP that obtains an access opportunity for the channel in the coordinated group. A time length of the effective time period exceeds a time length of a transmit opportunity TXOP.

Because the coordinated frame is used to indicate the at least one AP in the coordinated group and the first AP to perform the coordinated operation within the effective time period, based on the coordinated frame, each AP in the coordinated group performs the coordinated operation within the effective time period. In this way, the following case can be avoided: A plurality of APs in the coordinated group simultaneously occupy the same frequency resource on the channel within the effective time period to transmit data, thereby reducing a probability that a conflict exists between the plurality of APs and improving channel utilization.

In addition, when the coordinated group is established, the first AP needs to exchange information with another AP in a WLAN. If the coordinated group is highly frequently established in the WLAN, information exchanged in establishing the coordinated group consumes a large quantity of network resources. Because the time length of the effective time period exceeds the time length of the TXOP, that is, the time length of the effective time period is relatively long, frequency of establishing the coordinated group can be reduced, thereby reducing consumption of network resources.

In a possible implementation, the coordinated frame further indicates an allocation manner of a resource on which the at least one AP performs the coordinated operation within the effective time period, and the resource allocation manner includes a frequency resource and/or a time resource that are/is available to the at least one AP. In this way, within the effective time period, the AP in the coordinated group transmits data, based on the resource allocation manner, by using the frequency resource that can be used by the AP, and/or the AP in the coordinated group obtains an access opportunity for a frequency resource in the channel within the time resource that can be used by the AP, thereby avoiding a conflict between the APs in the coordinated group.

In another possible implementation, the first AP determines the effective time period based on status information of each AP in the coordinated group. The status information of each AP is used to describe a resource required by each AP. In this way, precision of the determined effective time period can be increased, so that the AP in the coordinated group can transmit respective to-be-transmitted data within the effective time period.

In another possible implementation, in a transmit opportunity TXOP, the first AP determines the effective time period based on the status information of each AP in the coordinated group. The TXOP is prior to the effective time period. A start time of the TXOP is the same as a time at which the first AP obtains the access opportunity for the channel. In this way, there is no time intersection between the TXOP and the effective time period. The effective time period is determined in the TXOP. In this way, a time period of establishing the coordinated group is decoupled from a time period in which the AP in the coordinated group performs coordinated communication.

In another possible implementation, in the TXOP, the first AP sends a radio frame to at least one target AP. A coverage area of the first AP overlaps a coverage area of each target AP. The first AP and each target AP operate on the same channel. The radio frame is used to trigger each target AP to determine whether to participate in the coordinated group. The first AP receives status information of a second AP that is sent by the second AP. The second AP is a target AP that determines to participate in the coordinated group.

In another possible implementation, the first AP receives an acknowledgment ACK frame from the second AP. The ACK frame indicates that the second AP has acknowledged the effective time period.

In another possible implementation, the coordinated frame is a multiple user physical protocol data unit MU PPDU frame.

According to a second aspect, this application provides an apparatus for coordinated communication between multiple access points, configured to perform the method in the first aspect or any possible implementation of the first aspect. Specifically, the apparatus includes units configured to perform the method in the first aspect or any possible implementation of the first aspect.

According to a third aspect, this application provides an apparatus for coordinated communication between multiple access points. The apparatus includes a transceiver, a processor, and a memory. The transceiver, the processor, and the memory may be connected through an internal connection. The memory is configured to store a program, instructions, or code. The processor is configured to execute the program, the instructions, or the code in the memory and cooperate with the transceiver, so that the apparatus completes the method in the first aspect or any possible implementation of the first aspect.

According to a fourth aspect, this application provides a computer program product. The computer program product includes a computer program stored in a computer-readable storage medium. The computer program is loaded by a processor to implement the method in the first aspect or any possible implementation of the first aspect.

According to a fifth aspect, this application provides a computer readable storage medium, configured to store a computer program. The computer program is loaded by a processor to execute instructions of the method in the first aspect or any possible implementation of the first aspect.

BRIEF DESCRIPTION OF DRAWINGS

FIG. 5 is a flowchart of a method for establishing a coordinated group according to an embodiment of this application;

FIG. 6 is a schematic diagram of a structure of a radio frame according to an embodiment of this application;

FIG. 7 is a schematic diagram of an allocation manner of resources for APs in a coordinated group according to an embodiment of this application;

DESCRIPTION OF EMBODIMENTS

The following further describes in detail embodiments of this application with reference to the accompanying drawings.

Figure 1:
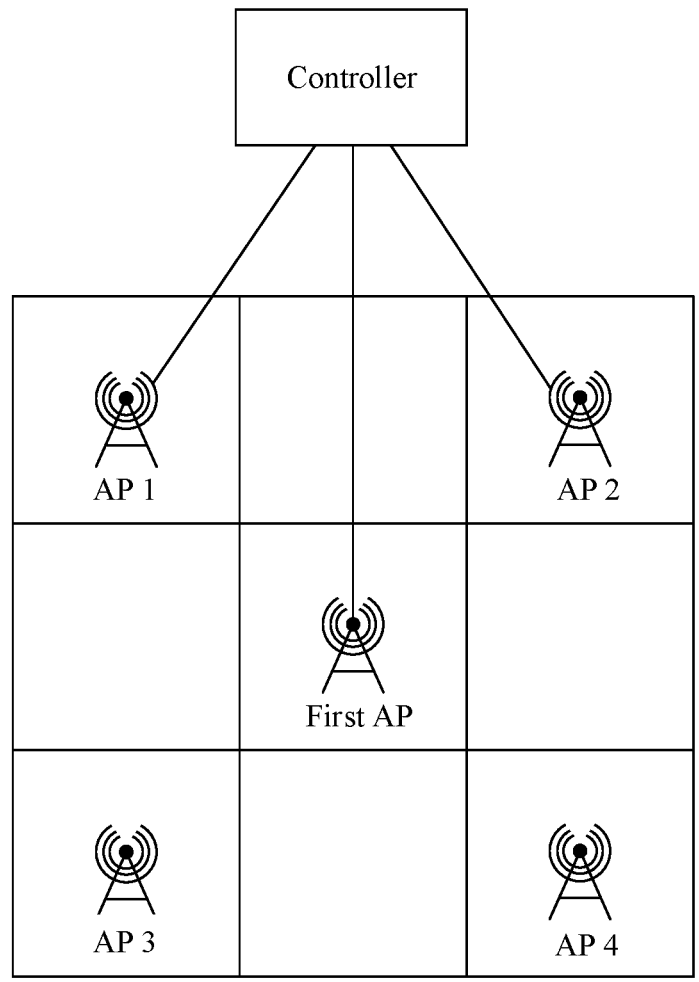
FIG. 1 is a schematic diagram of a structure of a WLAN according to an embodiment of this application.

With reference to FIG. 1, this application provides a network architecture of a WLAN. The WLAN includes a plurality of APs. Each AP may be accessed by at least one STA. For each AP in the WLAN, the AP operates on one channel. A channel bandwidth on which the AP operates is relatively large. For example, the AP operates on an 80 MHz channel or a 160 MHz channel.

Figure 2:
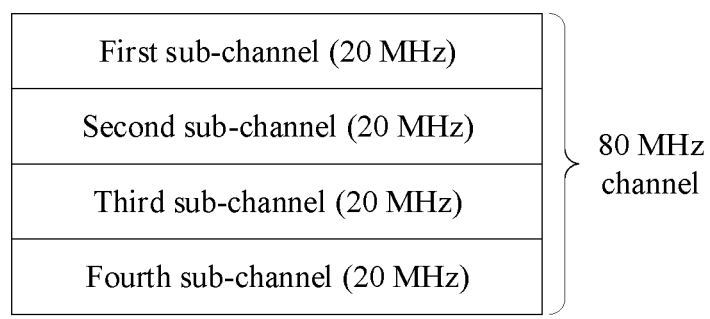
FIG. 2 is a schematic diagram of a structure of a channel according to an embodiment of this application.

Optionally, the channel includes a plurality of sub-channels. For example, with reference to FIG. 2, for an 80 MHz channel, the channel may include a first sub-channel, a second sub-channel, a third sub-channel, and a fourth sub-channel. The four sub-channels are all 20 MHz sub-channels.

For ease of description, any AP in the WLAN is referred to as a first AP. The first AP may transmit data on a channel on which the first AP operates. Before transmitting the data through the channel, the first AP needs to first obtain an access opportunity for the channel, to transmit the data through the channel.

A quantity of channels is limited. The WLAN includes a plurality of APs. Therefore, for the same channel, there may be a plurality of APs operating on the channel. There are a plurality of APs whose coverage areas overlap in the APs operating on the channel. When the plurality of APs transmit data on the channel, a probability of generating a conflict is relatively high, and channel utilization is reduced.

To improve channel utilization, when the first AP obtains the access opportunity for the channel, a coordinated group may be established, and an effective time period corresponding to the coordinated group is determined. The coordinated group includes the first AP and at least one AP other than the first AP in the WLAN. All APs in the coordinated group operate on the same channel. A time length of the effective time period exceeds a time length of a transmit opportunity (transmit opportunity, TXOP).

The first AP further determines a frequency resource and/or a time resource that can be used by each AP in the coordinated group. For each AP in the coordinated group, the frequency resource that can be used by the AP includes at least one sub-channel in the channel, and the time resource that can be used by the AP belongs to the effective time period. The AP may obtain, within the time resource, an access opportunity of the frequency resource that can be used by the AP.

In this way, each AP in the coordinated group obtains, within the effective time period, an access opportunity for a frequency resource that can be used by the AP, and transmits data by using the frequency resource; or each AP obtains, within the time resource that can be used by the AP, an access opportunity for a frequency resource that can be used by the AP, and then transmits data by using the frequency resource, so that each AP in the coordinated group implements coordinated communication within the effective time period. In this way, a probability that a conflict occurs is reduced, and channel utilization is improved.

Optionally, the time length of the TXOP falls within a specified time length range. Optionally, a maximum allowable time length of the TXOP is less than or equal to an upper limit value of the specified time length range.

Optionally, the network architecture further includes a controller. Each AP in the WLAN further communicates with the controller.

Optionally, for each AP in the WLAN, the AP sends capability information of the AP to the controller. The capability information includes an identifier and a coverage area of the operating channel of the AP.

Optionally, the AP sends status information of the AP to the controller. The status information of the AP includes one or more of the following: a volume of to-be-transmitted data of the AP, a first transmission time required by the AP to transmit the to-be-transmitted data on the channel, channel quality of each sub-channel of the channel for the AP, and the like.

Therefore, the controller may store the capability information and/or the status information of each AP in the WLAN.

Figure 3:
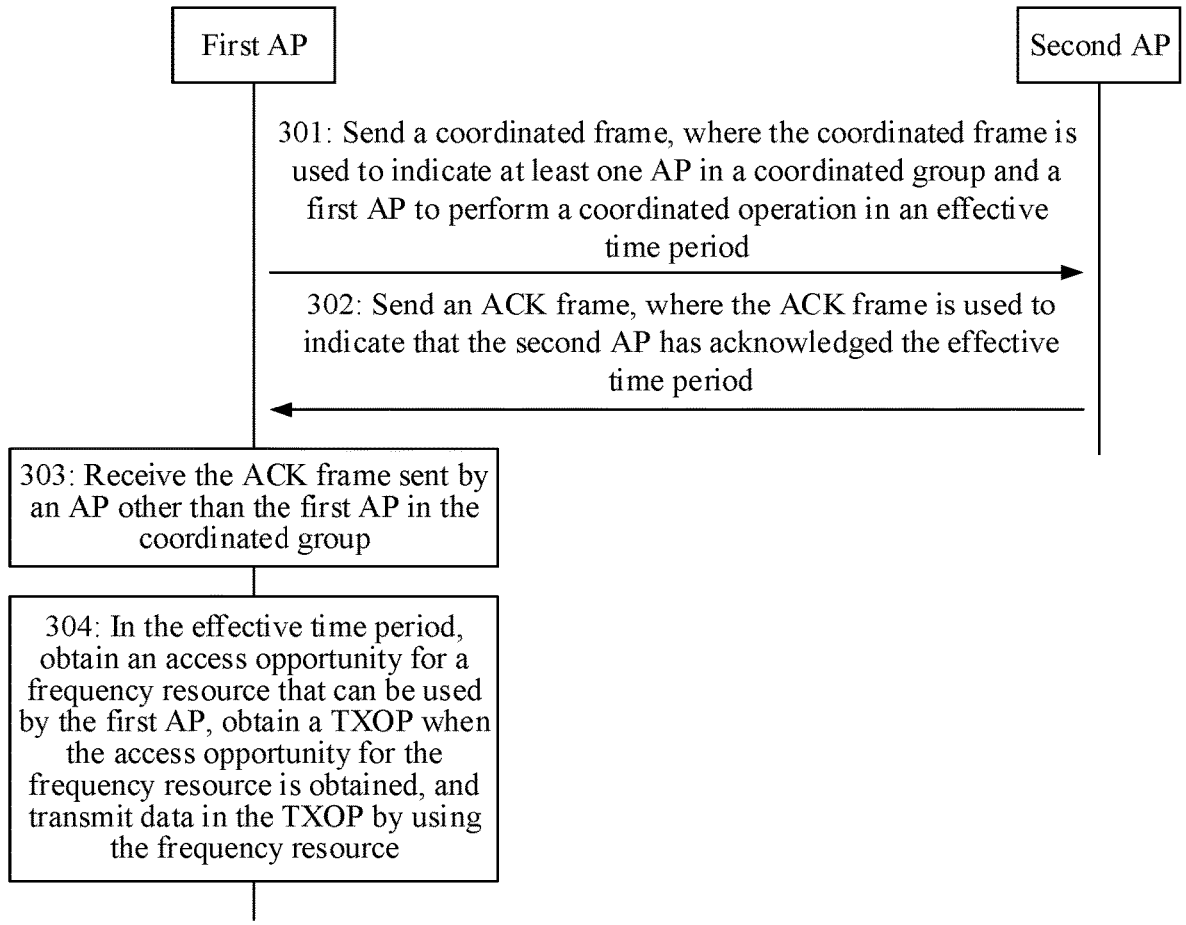
FIG. 3 is a flowchart of a method for coordinated communication between multiple access points according to an embodiment of this application.

With reference to FIG. 3, an embodiment of this application provides a method for coordinated communication between multiple access points. The method is applied to the WLAN shown in FIG. 1. The method includes the following steps.

Step 301: A first AP sends a coordinated frame to an AP in a coordinated group. The coordinated frame is used to indicate at least one AP in the coordinated group and the first AP to perform a coordinated operation in an effective time period.

The coordinated group includes a plurality of APs operating on the same channel. The first AP is an AP that obtains an access opportunity for the channel in the coordinated group. A time length of the effective time period exceeds a time length of a TXOP.

Optionally, the first AP sends the coordinated frame to at least one AP other than the first AP in the coordinated group.

Optionally, the coordinated operation includes: The AP in the coordinated group obtains, within the effective time period, an access opportunity for a frequency resource that can be used by the AP, and/or the AP obtains, within a time resource that can be used by the AP, the access opportunity for the frequency resource that can be used by the AP.

A frequency resource that can be used by the AP includes at least one sub-channel of the channel. A time resource that can be used by the AP is a sub-time period of the effective time period.

Optionally, the first AP further allocates a resource unit (resource unit, RU) to each AP other than the first AP in the coordinated group. RUs of APs are different. The RU of each AP belongs to the channel. The coordinated frame includes an identifier of the RU of each AP.

Optionally, the coordinated frame further indicates an allocation manner of a resource on which the at least one AP performs the coordinated operation within the effective time period. The resource allocation manner includes a frequency resource and/or a time resource that are/is available to the at least one AP.

Optionally, the coordinated frame includes configuration information of the effective time period, and configuration information of a frequency resource that can be used by each AP of the at least one AP and/or configuration information of a time resource that can be used by each AP of the at least one AP. Therefore, the coordinated frame is used to indicate the coordinated operation and the resource allocation manner.

Optionally, the configuration information of the effective time period includes a start time and a time length of the effective time period, or includes a start time and an end time of the effective time period, or includes an end time and a time length of the effective time period.

Optionally, the configuration information of the frequency resource includes an identifier of each sub-channel in the frequency resource.

Optionally, the configuration information of the time resource includes a start time and a time length of the time resource, or includes a start time and an end time of the time resource, or includes an end time and a time length of the time resource.

Optionally, the coordinated frame is a multi-user physical layer convergence procedure protocol data unit (multi-user physical layer convergence procedure protocol data unit, MU/PPDU) frame. An orthogonal frequency division multiple access data (orthogonal frequency division multiple access, OFDMA DATA) frame is an MU/PPDU frame. Therefore, the coordinated frame may be an OFDMA DATA frame.

Figure 4:
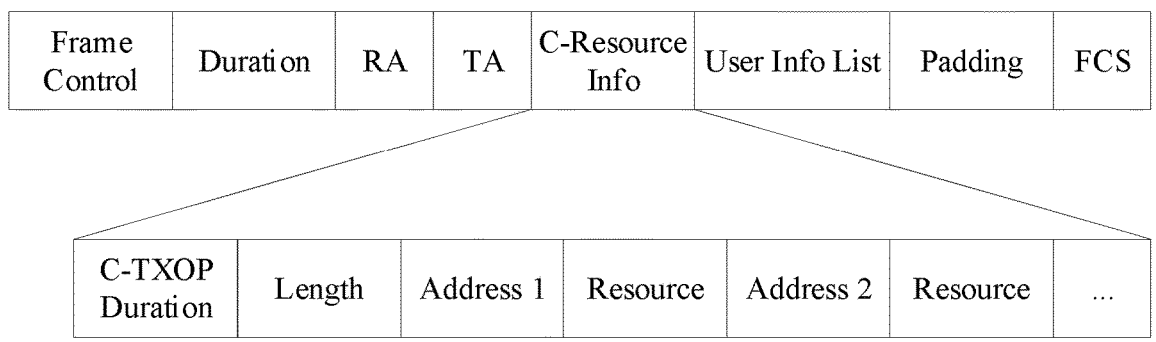
FIG. 4 is a schematic diagram of a structure of a coordinated frame according to an embodiment of this application.

Optionally, with reference to FIG. 4, the coordinated frame includes fields such as a frame control (Frame Control) field, a duration (Duration) field, a receiver address (receiver address, RA) field, a transmitter address (transmitter address, TA) field, a coordinated resource information (coordinated, resource information, C-Resource Info) field, a user information list (User info List) field, a padding (Padding) field, and a frame check sequence (frame check sequence, FCS) field. The C-Resource Info field includes a resource allocation manner of at least one AP in the coordinated group.

Optionally, the C-Resource Info field includes fields such as a coordinated transmit opportunity duration (coordinated transmit opportunity duration, C-TXOP Duration) field, a length (Length) field, and an address (Address) field and a resource (Resource) field that are corresponding to each AP in the at least one AP. The C-TXOP Duration field includes configuration information of the effective time period. The Address field corresponding to each AP includes an identifier of each AP. The Resource field corresponding to each AP includes configuration information of a frequency resource of each AP and/or configuration information of a time resource of each AP.

Optionally, before performing step 301, the first AP may first determine each AP in the coordinated group and the effective time period of the coordinated group.

Optionally, the first AP determines each AP in the coordinated group and the effective time period of the coordinated group in the following two manners. The two manners are merely examples of determining the coordinated group and the effective time period. Certainly, there may be other examples of determining the coordinated group and the effective time period. The examples are not listed one by one herein.

In a first manner, the first AP may trigger, by using a radio frame, an AP in the WLAN to determine whether to participate in the coordinated group, obtain status information of each AP that agrees to participate in the coordinated group, form the coordinated group by using the first AP and the AP that agrees to participate in the coordinated group, and determine the effective time period of the coordinated group based on the status information of each AP in the coordinated group.

Optionally, with reference to FIG. 5, the first manner may be implemented by using operations in the following steps 31 to 34. The operations in the steps 31 to 34 are as follows.

Step 31: The first AP obtains an access opportunity for a channel on which the first AP operates. The first AP is any AP in the WLAN.

Optionally, the first AP detects the channel on which the first AP operates, determines a back-off time length and continues to detect the channel when detecting that duration in which the channel is in an idle state reaches a specified time length, and obtains the access opportunity for the channel when continuing to detect that the duration in which the channel is in the idle state reaches the back-off time length.

Optionally, when obtaining the access opportunity for the channel, the first AP obtains a TXOP.

A start time of the TXOP is equal to a time at which the first AP obtains the access opportunity for the channel.

Step 32: The first AP sends a radio frame to at least one target AP. A coverage area of the target AP overlaps a coverage area of the first AP. The first AP and the target AP operate on the same channel. The radio frame is used to trigger the target AP to determine whether to participate in the coordinated group.

Optionally, in this step, in the TXOP, the first AP determines, as the target AP, each AP that operates on the same channel as the first AP and whose coverage area overlaps the coverage area of the first AP, and allocates an RU to each target AP. The RU of each target AP is a resource belonging to the channel. Each target AP has a different RU. The RU of each target AP is used to transmit a response message of each target AP for the radio frame. Then, in the TXOP, the first AP sends a radio frame to each target AP. The radio frame includes an identifier of each target AP and an identifier of the RU of each target AP.

Optionally, for any AP in the WLAN, the AP may periodically or aperiodically send a beacon frame on a channel on which the AP operates. The beacon frame includes an identifier and capability information of the AP. The capability information includes information such as a coverage area of the AP and an identifier of the channel on which the AP operates. The beacon frame may be received by another AP in the WLAN. The another AP receives the beacon frame, and stores the identifier and the capability information of the AP that are included in the beacon frame. Therefore, any AP in the WLAN may store an identifier and capability information of another AP in the WLAN.

Optionally, an operation that the first AP determines the target AP may be as follows: The first AP determines, based on the capability information of the first AP and locally stored capability information of another AP in the WLAN, the target AP that operates on the same channel as the first AP and whose coverage area overlaps the coverage area of the first AP.

Optionally, with reference to FIG. 6, the radio frame may be a trigger (Trigger) frame. The Trigger frame includes fields such as Frame Control, Duration, RA, TA, Common Information (Common info), User info List, Padding, and FCS. In this step, a new type of Trigger frame is defined. A Frame Control field in the Trigger frame is set to include a new Trigger frame type. In this way, the trigger frame can be transmitted between the first AP and the target AP, and is used to trigger the target AP to determine whether to participate in the coordinated group. The user information list field includes an identifier of each target AP and an identifier of an RU.

Step 33: For any target AP, the target AP receives the radio frame, and determines, as being triggered by the radio frame, whether to participate in the coordinated group. If determining to participate in the coordinated group, the target AP sends a response frame to the first AP. The response frame includes status information of the target AP. The status information is used to describe a resource required by the target AP.

Optionally, if determining not to participate in the coordinated group, the target AP sends a response frame to the first AP. The response frame includes a rejection indication. The rejection indication is used to indicate that the target AP determines not to participate in the coordinated group. Alternatively, if determining not to participate in the coordinated group, the target AP may not send a response frame to the first AP.

Optionally, the target AP may obtain the identifier of the RU of the target AP from the radio frame, and send the response frame to the first AP by using the RU based on the identifier of the RU.

Optionally, the status information of the target AP includes one or more of the following: a volume of to-be-transmitted data of the target AP, a first transmission time required by the target AP to transmit the to-be-transmitted data on the channel, channel quality of each sub-channel of the channel for the target AP, and the like.

Optionally, for a first transmission time, the target AP obtains the first transmission time based on channel quality of the channel on which the target AP operates, a bandwidth of the channel, and the volume of the to-be-transmitted data.

Optionally, the response frame is an MU/PPDU frame. Optionally, the response frame may be an OFDMA DATA frame.

Step 34: The first AP receives the response frame sent by each target AP, determines, based on the response frame sent by each target AP, the target AP that agrees to participate in the coordinated group, and determines the effective time period of the coordinated group based on the status information of each AP in the coordinated group. The coordinated group includes the first AP and each target AP that agrees to participate in the coordinated group.

Optionally, for a target AP, if the first AP does not receive, in a timeout time period, the response frame sent by the target AP, it is determined that the target AP does not agree to participate in the coordinated group. A time length of the timeout time period is a time threshold. A start time is equal to a sending time at which the first AP sends the radio frame.

Optionally, in this step, the first AP identifies, from the received response frame sent by each target AP, a target response frame that includes status information, determines a target AP sending the target response frame as the target AP that agrees to participate in the coordinated group, and forms the coordinated group by using the first AP and the determined target AP. The first AP obtains, based on the status information of each AP in the coordinated group, a time length of the effective time period of the coordinated group, and obtains an allocation manner of a resource on which each AP in the coordinated group performs a coordinated operation in the effective time period.

The resource allocation manner includes a frequency resource and/or a time resource that can be used by the AP in the coordinated group. The time length of the effective time period is greater than the time length of the TXOP.

Optionally, the time length of the effective time period is greater than a maximum allowable time length of the TXOP.

Optionally, the frequency resource that can be used by the AP includes at least one sub-channel of the channel. The time resource that can be used by the AP belongs to the effective time period, and is a sub-time period of the effective time period. In the time resource, the AP may contend for a frequency resource that can be used by the AP.

Optionally, for a plurality of APs that can use the same frequency resource, time resources of the plurality of APs may be different, to prevent the plurality of APs from contending for the frequency resource at the same time.

Optionally, the following lists two instances to obtain the time length and the frequency resource that can be used by the AP in the coordinated group. The two instances are merely two examples. Certainly, there may be other instances for implementation, which are not listed one by one herein. The two instances are as follows.

In a first instance, the first AP determines, based on the status information of each AP in the coordinated group, a frequency resource that can be used by each AP, and determines the time length of the effective time period based on a volume of to-be-transmitted data of each AP and the frequency resource that can be used by each AP.

In the first instance, the following operations: (1-1) to (1-3) may be used for implementation. The operations: (1-1) to (1-3) are as follows.

(1-1): The first AP determines, based on channel quality of each sub-channel of a channel for each AP in the coordinated group, the frequency resource that can be used by each AP in the coordinated group.

For any AP in the coordinated group, when the status information of the AP includes the channel quality of each sub-channel of the channel for the AP, the first AP selects, based on the channel quality of each sub-channel of the channel for the AP, at least one sub-channel with best channel quality, and allocates the at least one sub-channel to the AP. The frequency resource that can be used by the AP includes the at least one sub-channel.

Optionally, for some sub-channels, the sub-channels are allocated to a plurality of APs. A different time resource may be further allocated to each of the plurality of APs.

(1-2): The first AP obtains a second transmission time of each AP based on the volume of the to-be-transmitted data of each AP and the frequency resource that can be used by each AP.

The second transmission time of the AP is a time required by the AP to transmit the to-be-transmitted data on the frequency resource that can be used by the AP.

For each AP in the coordinated group and for each sub-channel included in the frequency resource that can be used by the AP, the volume of the to-be-transmitted data of the AP and the channel quality of each sub-channel for the AP are extracted from the status information of the AP. The second transmission time of the AP is obtained based on the volume of the to-be-transmitted data, the channel quality of each sub-channel for the AP, and a bandwidth of each sub-channel.

(1-3): The first AP determines the effective time period of the coordinated group based on the second transmission time of each AP in the coordinated group and the frequency resource that can be used by each AP.

Optionally, the first AP obtains the time length of the effective time period of the coordinated group based on the second transmission time of each AP in the coordinated group and the frequency resource that can be used by each AP. A start time of the effective time period is an end time of the obtained TXOP, or a start time of the effective time period is later than an end time of the obtained TXOP.

Optionally, for the time length of the effective time period, an operation that the first AP obtains the time length may be as follows: For any sub-channel of the channel, the first AP determines, based on the frequency resource that can be used by each AP in the coordinated group, each AP that can use the sub-channel; and accumulates second transmission times of the APs to obtain a total time of the sub-channel. A maximum total time is selected from the total times of all the sub-channels included in the channel. The time length of the effective time period is determined based on the maximum total time.

Optionally, the maximum total time is multiplied by a coefficient to obtain the time length of the effective time period. The coefficient may be greater than 1, equal to 1, or less than 1. In other words, the time length may be greater than, equal to, or less than the maximum total time.

For example, with reference to FIG. 1, it is assumed that the first AP, an AP 1, an AP 2, an AP 3, and an AP 4 form a coordinated group. In other words, the coordinated group includes the first AP, the AP 1, the AP 2, the AP 3, and the AP 4. It is assumed that a channel on which the first AP operates is an 80 MHz channel shown in FIG. 2, and the channel includes four sub-channels: respectively a first sub-channel, a second sub-channel, a third sub-channel, and a fourth sub-channel. With reference to FIG. 7, it is assumed that a frequency resource that can be used by the first AP includes the first sub-channel, a frequency resource that can be used by the AP 1 includes the second sub-channel, a frequency resource that can be used by the AP 2 includes the third sub-channel, and a frequency resource that can be used by the AP 3 and a frequency resource that can be used by the AP 4 each include the fourth sub-channel. It is assumed that second transmission times of the first AP, the AP 1, the AP 2, the AP 3, and the AP 4 are respectively 30 milliseconds, 10 milliseconds, 25 milliseconds, 20 milliseconds, and 15 milliseconds.

For the first sub-channel, if the first AP determines that APs that can use the first sub-channel include the first AP, a total time of the first sub-channel is equal to the second transmission time "30 milliseconds" of the first AP. For the second sub-channel, if the first AP determines that APs that can use the second sub-channel include the AP 1, a total time of the second sub-channel is equal to the second transmission time "10 milliseconds" of the AP 1. For the third sub-channel, if the first AP determines that APs that can use the third sub-channel include the AP 2, a total time of the third sub-channel is equal to the second transmission time "25 milliseconds" of the AP 2. For the fourth sub-channel, if the first AP determines that APs that can use the fourth sub-channel include the AP 3 and the AP 4, the second transmission time "20 milliseconds" of the AP 3 and the second transmission time "15 milliseconds" of the AP 4 are accumulated, to obtain a total time "35 milliseconds" of the fourth sub-channel.

The first AP selects a maximum total time "35 milliseconds" from the total time "30 milliseconds" of the first sub-channel, the total time "10 milliseconds" of the second sub-channel, the total time "15 milliseconds" of the third sub-channel, and the total time "35 milliseconds" of the fourth sub-channel, and multiplies the maximum total time "35 milliseconds" by a coefficient to obtain the time length of the effective time period. It is assumed that the coefficient is equal to 0.8. In this case, the obtained time length of the effective time period is "28 milliseconds".

In a second instance, the first AP determines the time length of the effective time period based on the status information of each AP in the coordinated group, and determines, based on the status information of each AP and the time length, the frequency resource that can be used by each AP.

In the second instance, the following operations: (2-1) to (2-3) may be used for implementation. The operations: (2-1) to (2-3) are as follows.

(2-1): The first AP obtains a first transmission time required by each AP in the coordinated group to transmit the to-be-transmitted data on the channel.

For ease of description, the first transmission time required by the AP to transmit the to-be-transmitted data on the channel is briefly referred to as the first transmission time of the AP below.

When the status information of each AP in the coordinated group includes the first transmission time of each AP, the first AP obtains the first transmission time of each AP from the status information of each AP.

If the status information of each AP in the coordinated group includes the volume of the to-be-transmitted data of each AP and the channel quality of each sub-channel of the channel for each AP, the first AP calculates the first transmission time of each AP based on the volume of the to-be-transmitted data of each AP, the channel quality of each sub-channel of the channel for each AP, and the bandwidth of the channel.

(2-2): The first AP determines the time length of the effective time period based on the first transmission time of each AP.

Optionally, the first AP calculates an average transmission time based on the first transmission time of each AP, and determines the time length of the effective time period based on the average transmission time.

Optionally, the average transmission time is multiplied by a coefficient to obtain the time length of the effective time period. The coefficient may be greater than 1, equal to 1, or less than 1. In other words, the time length may be greater than, equal to, or less than the average transmission time.

(2-3): The first AP determines the frequency resource of each AP based on the volume of the to-be-transmitted data of each AP, the channel quality of each sub-channel of the channel for each AP, a bandwidth of each sub-channel, and the time length.

Optionally, for each AP in the coordinated group, the first AP calculates the second transmission time of the AP on each sub-channel based on the volume of the to-be-transmitted data of the AP, channel quality of each sub-channel in a first sub-channel set for each AP, and the bandwidth of each sub-channel. The first sub-channel set includes each sub-channel of the channel.

The second transmission time of the AP on each sub-channel is a transmission time required by the AP to transmit the to-be-transmitted data on each sub-channel.

The first AP selects a sub-channel with a minimum second transmission time from the first sub-channel set, determines whether the sub-channel has been allocated to another AP other than the AP in the coordinated group, and if the sub-channel has not been allocated to another AP, allocates the sub-channel to the AP. If the sub-channel has been allocated to another AP, and a time difference between the time length and the second transmission time of the another AP on the sub-channel is greater than the second transmission time of the AP on the sub-channel, the first AP allocates the sub-channel to the AP.

If the time difference is less than or equal to the second transmission time of the AP on the sub-channel, the first AP removes the sub-channel from the first sub-channel set to obtain a second sub-channel set, selects a sub-channel with a minimum second transmission time from the second sub-channel set, and continues to perform the foregoing operation of determining. The frequency resource that can be used by the AP includes a sub-channel allocated to the AP.

For example, with reference to FIG. 7, for the first AP in the coordinated group, the first AP determines, through calculation based on a volume of to-be-transmitted data of the first AP, channel quality of the first sub-channel for the first AP, channel quality of the second sub-channel, channel quality of the third sub-channel, channel quality of the fourth sub-channel, a bandwidth of the first sub-channel, a bandwidth of the second sub-channel, a bandwidth of the third sub-channel, and a bandwidth of the fourth sub-channel, that the second transmission time of the first AP on the first sub-channel is "30 milliseconds", the second transmission time on the second sub-channel is "35 milliseconds", the second transmission time on the third sub-channel is "36 milliseconds", and the second transmission time on the fourth sub-channel is "40 milliseconds". The first sub-channel with the minimum second transmission time is selected from a sub-channel set. The sub-channel set includes the first sub-channel, the second sub-channel, the third sub-channel, and the fourth sub-channel. The first sub-channel is allocated to the first AP. In other words, the frequency resource that can be used by the first AP includes the first sub-channel.

According to the foregoing same operation, the second sub-channel is allocated to the AP 1, the third sub-channel is allocated to the AP 2, and the fourth sub-channel is allocated to the AP 3. In other words, the frequency resource that can be used by the AP 1 includes the second sub-channel, the frequency resource that can be used by the AP 2 includes the third sub-channel, and the frequency resource that can be used by the AP 3 includes the fourth sub-channel.

For the AP 4, based on a volume of to-be-transmitted data of the AP 4, channel quality of the first sub-channel for the AP 4, channel quality of the second sub-channel, channel quality of the third sub-channel, channel quality of the fourth sub-channel, the bandwidth of the first sub-channel, the bandwidth of the second sub-channel, the bandwidth of the third sub-channel, and the bandwidth of the fourth sub-channel, it is determined through calculation that the second transmission time of the AP 4 on the first sub-channel is "45 milliseconds", the second transmission time on the second sub-channel is "35 milliseconds", the second transmission time on the third sub-channel is "40 milliseconds", and the second transmission time on the fourth sub-channel is "30 milliseconds". The fourth sub-channel with the minimum second transmission time is selected from the sub-channel set. The fourth sub-channel has been allocated to the AP 3. It is assumed that the second transmission time of the AP 3 on the fourth sub-channel is "20 milliseconds" and that the time length of the effective time period is "55 milliseconds". Therefore, it is determined through calculation that a time difference between the time length "55 milliseconds" and the second transmission time "20 milliseconds" of the AP 3 on the fourth sub-channel is "35 milliseconds". If the time difference "35 milliseconds" is greater than the second transmission time "30 milliseconds" of the AP 4 on the fourth sub-channel, the fourth sub-channel is allocated to the AP 4. In other words, the frequency resource that can be used by the AP 4 also includes the fourth sub-channel.

Optionally, the first AP further allocates, to the AP 3, a time resource used to contend for the fourth sub-channel, and allocates, to the AP 4, a time resource used to contend for the fourth sub-channel.

In a second manner, the first AP may obtain, by using the controller, the status information of each AP that needs to form the coordinated group with the first AP. The first AP and each AP form the coordinated group. The effective time period of the coordinated group is determined based on the status information of each AP in the coordinated group.

Optionally, in the second manner, the controller may collect capability information of each AP in the WLAN. Each AP in the WLAN further sends respective status information to the controller.

Optionally, in the second manner, the first AP obtains the access opportunity for the channel on which the first AP operates, and sends a request message to the controller. The controller determines, based on the capability information of the first AP and the capability information of each of other APs in the WLAN, each AP that operates on the same channel as the first AP and whose coverage area overlaps the coverage area of the first AP, selects, based on the determined status information of each AP, at least one AP that needs to form the coordinated group with the first AP, and sends an identifier and status information of each AP in the at least one AP to the first AP. The first AP receives the request message. The first AP and the at least one AP form the coordinated group. Based on the status information of each AP in the coordinated group, the effective time period is determined, and a resource allocation manner of each coordinated group is obtained.

Optionally, for a detailed implementation process in which the first AP determines the effective time period and obtains the resource allocation manner of each coordinated group, refer to related content in step 34. Details are not described herein again.

Optionally, for each AP determined by the controller, when the volume that is of the to-be-transmitted data of the AP and that is included in the status information of the AP is not 0, it indicates that the AP needs to transmit data. The controller selects the AP as an AP that needs to form the coordinated group with the first AP.

Optionally, for ease of description, any AP other than the first AP in the coordinated group is referred to as a second AP. The second AP may perform the following operations:

Step 302: The second AP receives the coordinated frame, and sends an acknowledgment (ACK) frame to the first AP. The ACK frame is used to indicate that the second AP has acknowledged the effective time period.

Optionally, the ACK frame includes an indication that the second AP acknowledges the effective time period.

Optionally, the second AP obtains configuration information of the effective time period from the coordinated frame, and determines the effective time period based on the configuration information of the effective time period; and/or obtains, from the coordinated frame, configuration information of a frequency resource that can be used by the second AP, and determines the frequency resource based on the configuration information of the frequency resource; and/or obtains, from the coordinated frame, configuration information of a time resource that can be used by the second AP, and determines the time resource based on the configuration information of the time resource.

Optionally, the second AP may obtain an identifier of a second RU of the second AP from the coordinated frame, and send the ACK frame to the first AP by using the second RU based on the identifier of the second RU.

Figure 8:
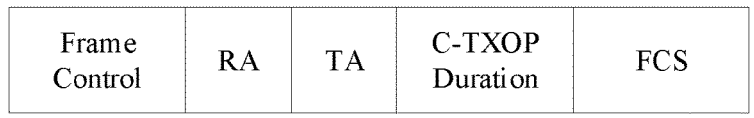
FIG. 8 is a schematic diagram of a structure of an acknowledgment frame according to an embodiment of this application.

Optionally, with reference to FIG. 8, the ACK frame includes fields such as Frame Control, RA, TA, C-TXOP Duration, and FCS. A new frame type is defined in this step. The new frame type is a coordinated ACK frame type. The Frame Control field included in the ACK frame is set to include the coordinated ACK frame type. Therefore, the ACK frame can be transmitted between APs. The C-TXOP Duration field includes the time length of the effective time period acknowledged by the second AP, so that the ACK frame is used to indicate that the second AP has acknowledged the effective time period.

Optionally, another AP other than the first AP in the coordinated group may send an ACK frame to the first AP in the same way as the second AP.

Step 303: The first AP receives the ACK frame sent by the AP other than the first AP in the coordinated group.

For example, the first AP receives the ACK frame sent by the second AP.

Optionally, the first AP does not receive, in a timeout time period after the coordinated frame is sent to the second AP, the ACK frame sent by the second AP. A time length of the timeout time period is a time threshold. A start time is equal to a sending time at which the first AP sends the coordinated frame. In this case, the coordinated frame is sent to the second AP after the timeout time period ends.

Optionally, the operations of step 301 to step 305 may be performed in one TXOP obtained by the first AP. In other words, the first AP needs to exchange information with the target AP in one TXOP for completing establishment of the coordinated group. The exchanged information includes a radio frame, a response frame, a coordinated frame, an ACK frame, and the like.

After the first AP receives the ACK sent by each of other APs other than the first AP in the coordinated group, each AP in the coordinated group performs coordinated communication in the effective time period. Still in the example of the first AP, a process in which the first AP performs coordinated communication in the effective time period is as follows.

Step 304: In the effective time period, the first AP obtains the access opportunity for the frequency resource that can be used by the first AP, obtains a TXOP when obtaining the access opportunity for the frequency resource, and transmits data in the TXOP by using the frequency resource.

Optionally, the frequency resource includes at least one sub-channel. In the effective time period, the first AP obtains at least one sub-channel access opportunity. When the first AP obtains the at least one sub-channel access opportunity, the first AP obtains the TXOP, and transmits data in the TXOP. After the TXOP ends, the first AP releases the at least one sub-channel. Then, the first AP may continue to obtain the at least one sub-channel access opportunity.

Optionally, after obtaining the at least one sub-channel access opportunity, the first AP obtains the TXOP based on the volume of the to-be-transmitted data of the first AP. A time length of the TXOP falls within a specified time length range.

Optionally, the another AP may be an AP in the coordinated group, or may not be an AP in the coordinated group.

Optionally, when the first AP still has a time resource that can be used, the first AP may obtain, in the time resource, an access opportunity for the frequency resource that can be used by the first AP.

Similar to the first AP, other APs in the coordinated group also contend for frequency resources that can be used by the APs in the effective time period. This is not described one by one.

Figure 9:
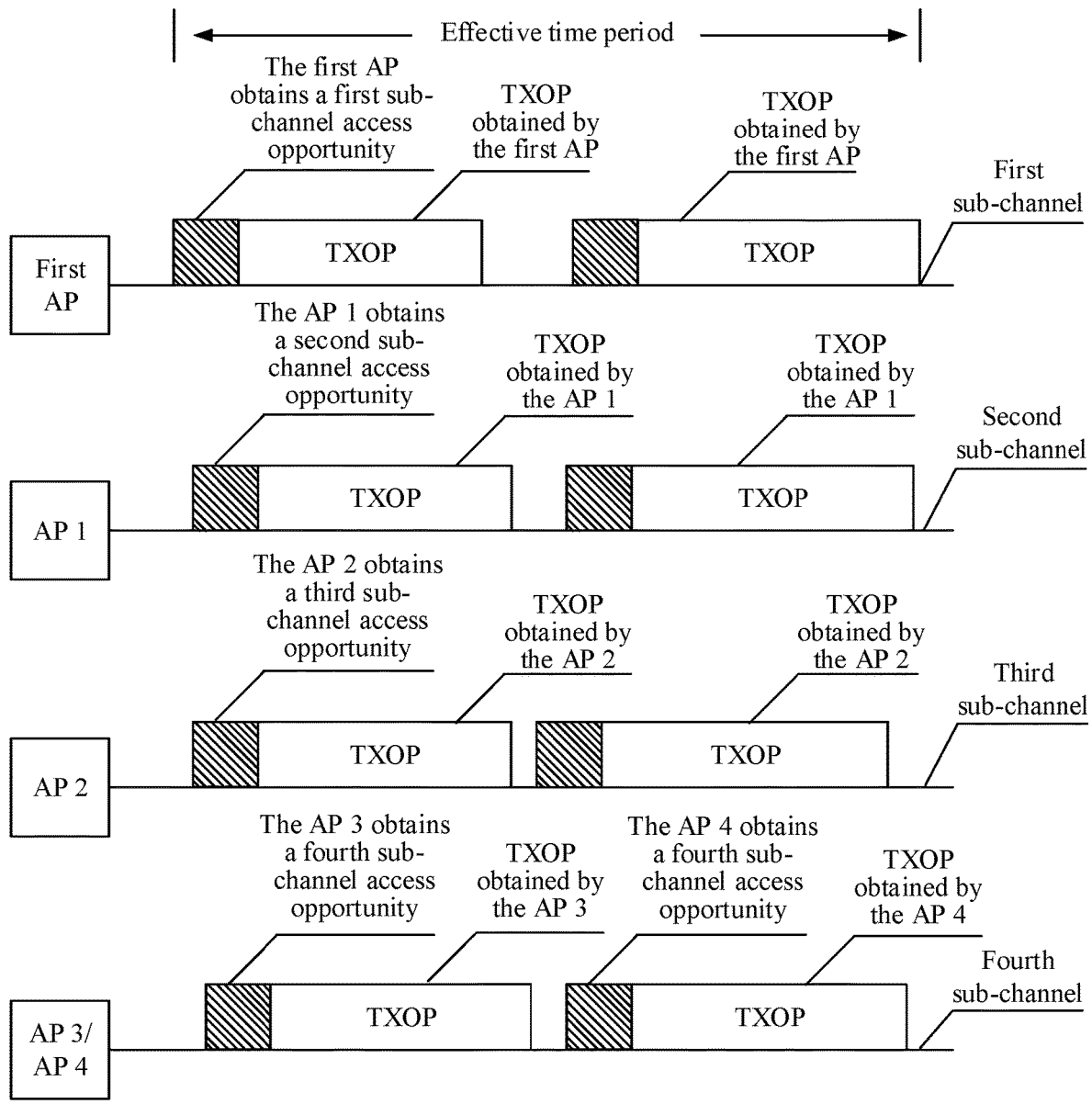
FIG. 9 is a schematic diagram of coordinated communication between APs in a coordinated group according to an embodiment of this application.

The following lists an example. In this example, the coordinated group is the coordinated group including the first AP, the AP 1, the AP 2, the AP 3, and the AP 4. With reference to FIG. 9, in the effective time period, the first AP obtains a first sub-channel access opportunity, obtains a TXOP when obtaining the first sub-channel access opportunity, and transmits data in the TXOP by using the first sub-channel. The AP 1 obtains a second sub-channel access opportunity, obtains a TXOP when obtaining the second sub-channel access opportunity, and transmits data in the TXOP by using the second sub-channel. The AP 2 obtains a third sub-channel access opportunity, obtains a TXOP when obtaining the third sub-channel access opportunity, and transmits data in the TXOP by using the third sub-channel. The AP 3 and the AP 4 each obtain a fourth sub-channel access opportunity, obtain a TXOP when either of the AP 3 and the AP 4 obtains the fourth sub-channel access opportunity, and transmit data in the TXOP by using the fourth sub-channel.

Optionally, after the effective time period ends, the coordinated group is automatically dismissed. Then, the APs in the WLAN obtain the access opportunity for the channel again, and perform coordinated communication according to the foregoing procedure from step 301 to step 304.

In this embodiment of this application, when the first AP obtains the access opportunity for the channel, the first AP and the at least one AP that operates on the same channel as the first AP and whose coverage area overlaps the coverage area of the first AP may form the coordinated group. The effective time period is determined for the coordinated group. The frequency resource that can be used on the channel is allocated to each AP in the coordinated group. In this way, in the effective time period, each AP in the coordinated group obtains an access opportunity for a frequency resource that can be used by the AP. For each AP in the coordinated group, the AP obtains the TXOP after obtaining the frequency resource access opportunity, and transmits data in the TXOP by using the frequency resource. In this way, a conflict generated when a plurality of APs simultaneously transmit data on the same frequency resource is avoided, to reduce a quantity of times of generating conflicts, that is, reduce a probability of generating conflicts, thereby improving channel utilization. The time length of the effective time period is greater than the time length of the TXOP. In this way, a quantity of times of establishing a coordinated group through negotiation can be reduced. Network resources need to be used to exchange various information for establishing the coordinated group through negotiation. Therefore, reducing the quantity of times may reduce a volume of exchanged information, thereby saving a large quantity of network resources.

Figure 10:
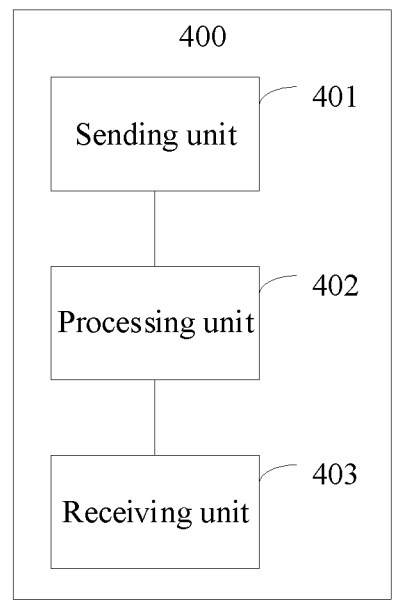
FIG. 10 is a schematic diagram of a structure of an apparatus for coordinated communication between multiple access points according to an embodiment of this application.

With reference to FIG. 10, an embodiment of this application provides an apparatus 400 for coordinated communication between multiple access points. The apparatus 400 may be deployed on the first AP provided in any one of the foregoing embodiments, and includes a sending unit 401.

The sending unit 401 is configured to send a coordinated frame to an AP in a coordinated group. The coordinated frame indicates at least one AP in the coordinated group and the apparatus 400 to perform a coordinated operation within an effective time period. The coordinated group includes a plurality of APs operating on the same channel. The apparatus 400 is an AP that obtains an access opportunity for the channel in the coordinated group. A time length of the effective time period exceeds a time length of a transmit opportunity TXOP.

Optionally, for a detailed implementation process in which the sending unit 401 sends the coordinated frame, refer to related content in step 304 in the embodiment shown in FIG. 3. Details are not described herein again.

Optionally, the coordinated frame further indicates an allocation manner of a resource on which the at least one AP performs the coordinated operation within the effective time period. The resource allocation manner includes a frequency resource and/or a time resource that are/is available to the at least one AP.

Optionally, the apparatus 400 further includes a processing unit 402.

The processing unit 402 is configured to determine the effective time period based on status information of each AP in the coordinated group. The status information of each AP is used to describe a resource required by each AP.

Optionally, for a detailed implementation process in which the processing unit 402 determines the effective time period, refer to related content in step 303 in the embodiment shown in FIG. 3. Details are not described herein again.

Optionally, the processing unit 402 is configured to:
determine, in a TXOP, the effective time period based on the status information of each AP in the coordinated group, where the TXOP is prior to the effective time period, and a start time of the TXOP is the same as a time at which the apparatus 400 obtains the access opportunity for the channel.

Optionally, the apparatus 400 further includes a receiving unit 403.

The receiving unit 403 is configured to receive an acknowledgment ACK frame from a second AP. The ACK frame is used to indicate that the second AP has acknowledged the effective time period.

Optionally, for a detailed implementation process in which the receiving unit 403 receives the ACK frame, refer to related content in step 305 in the embodiment shown in FIG. 3. Details are not described herein again.

In this embodiment of this application, because the coordinated frame is used to indicate the at least one AP in the coordinated group and the first AP to perform the coordinated operation within the effective time period, based on the coordinated frame, each AP in the coordinated group performs the coordinated operation within the effective time period. In this way, the following case is avoided: A plurality of APs in the coordinated group simultaneously occupy the same frequency resource on the channel to transmit data, thereby reducing a probability that a conflict exists between the plurality of APs and improving channel utilization. In addition, because the time length of the effective time period exceeds the time length of the TXOP, that is, the time length of the effective time period is relatively long, frequency of establishing the coordinated group can be reduced, thereby reducing consumption of network resources.

Figure 11:
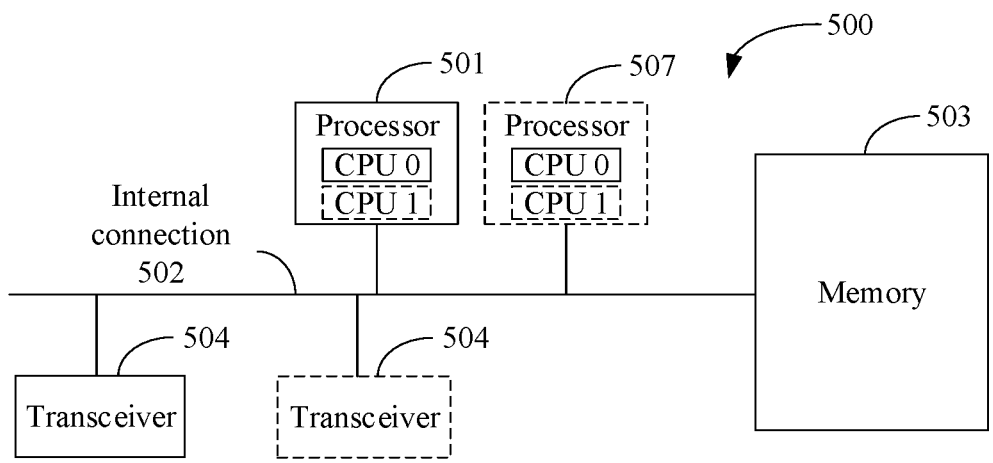
FIG. 11 is a schematic diagram of a structure of another apparatus for coordinated communication between multiple access points according to an embodiment of this application.

FIG. 11 is a schematic diagram of another apparatus 500 for coordinated communication between multiple access points according to an embodiment of this application. The apparatus 500 may be the first converter in any one of the foregoing embodiments. The apparatus 500 includes at least one processor 501, an internal connection 502, a memory 503, and at least one transceiver 504.

The apparatus 500 is an apparatus with a hardware structure, and may be configured to implement the function modules in the apparatus 400 shown in FIG. 10. For example, a person skilled in the art may figure out that the processing unit 402 in the apparatus 400 shown in FIG. 10 may be implemented through invoking code in the memory 503 by the at least one processor 501, and the sending unit 401 and the receiving unit 403 in the apparatus 400 shown in FIG. 10 may be implemented by using the transceiver 504.

Optionally, the apparatus 500 may be further configured to implement functions of the first AP in the embodiment shown in FIG. 1 or FIG. 3.

Optionally, the processor 501 may be a general-purpose central processing unit (central processing unit, CPU), a network processor (network processor, NP), a microprocessor, an application-specific integrated circuit (application-specific integrated circuit, ASIC), or one or more integrated circuits configured to control program execution of solutions of this application.

The internal connection 502 may include a path for transmitting information between the foregoing components. Optionally, the internal connection 502 is a single board, a bus, or the like.

The transceiver 504 is configured to communicate with another device or a communication network.

The memory 503 may be a read-only memory (read-only memory, ROM) or another type of static storage device that can store static information and instructions, or a random access memory (random access memory, RAM) or another type of dynamic storage device that can store information and instructions; or may be an electrically erasable programmable read-only memory (electrically erasable programmable read-only memory, EEPROM), a compact disc read-only memory (compact disc read-only memory, CD-ROM) or another optical disc storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory may exist independently, and is connected to the processor by using the bus. Alternatively, the memory may be integrated with the processor.

The memory 503 is configured to store application program code for executing the solutions in this application, and the processor 501 controls execution. The processor 501 is configured to execute the application program code stored in the memory 503, and cooperate with the at least one transceiver 504, so that the apparatus 500 implements functions in the method in this patent.

During specific implementation, in an embodiment, the processor 501 may include one or more CPUs, for example, a CPU 0 and a CPU 1 in FIG. 5.

During specific implementation, in an embodiment, the apparatus 500 may include a plurality of processors, for example, the processor 501 and a processor 507 shown in FIG. 5. Each of the processors may be a single-core (single-CPU) processor or a multi-core (multi-CPU) processor. Herein, the processor may be one or more devices, circuits, and/or processing cores configured to process data (for example, computer program instructions).

A person of ordinary skill in the art may understand that all or some of the steps of the foregoing embodiments may be implemented by hardware or a program instructing related hardware. The program may be stored in a computer-readable storage medium. The mentioned storage medium may be a read-only memory, a magnetic disk, a compact disc, or the like.

The foregoing descriptions are only optional embodiments of this application, but are not intended to limit this application. Any modification, equivalent replacement, or improvement made within the concept and principle of this application should fall within the protection scope of this application.

What is claimed is:

1. A method for coordinated communication between multiple access points, the method comprising:
   determining, by a first access point (AP) in a transmit opportunity (TXOP), an effective time period based on status information of the plurality of APs operating on a channel in a coordinated group, wherein the first AP is an AP that obtains an access opportunity for the channel in the coordinated group, wherein the TXOP is the same time as a time at which the first AP obtains the access opportunity for the channel, wherein the status information of the plurality of APs is used to describe respective resources required by the plurality of APs; and
   sending, by the first AP, a coordinated frame to one or more APs in the coordinated group, wherein the coordinated frame indicates at least one AP in the coordinated group and the first AP to perform a coordinated operation within the effective time period.

2. The method according to claim 1, wherein the coordinated frame further indicates a resource allocation manner used by the at least one AP to perform the coordinated operation within the effective time period, and the resource allocation manner indicates a resource available to the at least one AP, the resource comprising at least one of a frequency resource or a time resource.

3. The method according to claim 1, the method further comprising: receiving, by the first AP from a second AP in the coordinated group, an acknowledgment (ACK) frame indicating that the second AP has acknowledged the effective time period.

4. An apparatus for coordinated communication between multiple access points (APs), comprising:
   at least one processor, and
   a memory coupled to the at least one processor and configured to store a computer program, the computer program comprising instructions that, when executed by the at least one processor, cause the apparatus to perform the following operations:
   determining, in a transmit opportunity (TXOP), an effective time period based on status information of the plurality of APs operating on a channel in a coordinated group, wherein the TXOP is prior to the effective time period, and a start time of the TXOP is the same as a time at which the apparatus obtains an access opportunity for the channel, a time length of the effective time period is greater than a time length of the TXOP, wherein the status information of the plurality of APs is used to describe respective resources needed by the plurality of APs; and
   sending a coordinated frame to one or more APs in a coordinated group, wherein the coordinated frame indicates at least one AP in the coordinated group and the apparatus to perform a coordinated operation within the effective time period, the apparatus is an AP that obtains the access opportunity for the channel in the coordinated group.

5. The apparatus according to claim 4, wherein the coordinated frame further indicates a resource allocation manner used by the at least one AP to perform the coordinated operation within the effective time period, and the resource allocation manner indicates a resource available to the at least one AP, the resource comprising at least one of a frequency resource or a time resource.

6. The apparatus according to claim 4, wherein the computer program further comprises instructions that, when executed by the at least one processor, cause the apparatus to perform the following operations: receiving, from a second AP in the coordinated group, an acknowledgment (ACK) frame indicating that the second AP has acknowledged the effective time period.

7. A non-transitory computer-readable storage medium, storing a computer program, wherein when the computer program is executed by a computer, cause a first access point (AP) to perform the following operations:
   determining, by a first access point (AP) in a transmit opportunity (TXOP), an effective time period based on status information of the plurality of APs operating on a channel in a coordinated group, wherein the first AP is an AP that obtains an access opportunity for the channel in the coordinated group, wherein the TXOP is the same time as a time at which the first AP obtains the access opportunity for the channel, wherein the status information of the plurality of APs is used to describe respective resources required by the plurality of APs; and sending a coordinated frame to one or more APs in the coordinated group, wherein the coordinated frame indicates at least one AP in the coordinated group and the first AP to perform a coordinated operation within the effective time period.

8. The non-transitory computer-readable storage medium according to claim 7, wherein the coordinated frame further indicates a resource allocation manner used by the at least one AP to perform the coordinated operation within the effective time period, and the resource allocation manner indicates a resource available to the at least one AP, the resource comprising at least one of a frequency resource or a time resource.

9. The non-transitory computer-readable storage medium according to claim 7, wherein the computer program further comprises instructions that, when executed by the computer, cause the first AP to perform the following operations: receiving, from a second AP in the coordinated group, an acknowledgment (ACK) frame indicating that the second AP has acknowledged the effective time period.

* * * * *